(12) United States Patent
Reinhart et al.

(10) Patent No.: US 9,038,802 B2
(45) Date of Patent: May 26, 2015

(54) CLUTCH BACKING PLATE FOR BEARING SUPPORT

(75) Inventors: Timothy J. Reinhart, McCordsville, IN (US); Douglas Scott Burchett, Indianapolis, IN (US); Kenneth D. Schoch, Greenwood, IN (US); Gregory W. Kempf, Avon, IN (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/561,903

(22) Filed: Jul. 30, 2012

(65) Prior Publication Data

US 2014/0027237 A1    Jan. 30, 2014

(51) Int. Cl.
*F16D 13/52*       (2006.01)
*F16D 25/0638*   (2006.01)
*F16D 69/00*       (2006.01)

(52) U.S. Cl.
CPC ............ *F16D 13/52* (2013.01); *F16D 25/0638* (2013.01); *F16D 69/00* (2013.01)

(58) Field of Classification Search
USPC ................................ 192/85.25; 475/146, 322
See application file for complete search history.

(56) References Cited

U.S. PATENT DOCUMENTS

| | | | | |
|---|---|---|---|---|
| 5,901,826 | A * | 5/1999 | Datta ........................ | 192/107 M |
| 7,766,778 | B2 * | 8/2010 | Tabata et al. ...................... | 475/5 |
| 8,137,229 | B2 * | 3/2012 | Kempf et al. ...................... | 475/5 |
| 2007/0246321 | A1 * | 10/2007 | Toya .......................... | 192/70.14 |
| 2011/0067969 | A1 * | 3/2011 | Reed et al. ....................... | 192/14 |

* cited by examiner

*Primary Examiner* — Rodney H Bonck

(57) ABSTRACT

A clutch assembly includes a first set of clutch plates and a second set of clutch plates interweaved with the first set of clutch plates. The second set of clutch plates is coupled to a rotatable inner hub, and a stationary backing plate is mounted about the inner hub. The first set of clutch plates is coupled to the backing plate such that the first set of clutch plates and the second set of clutch plates are compressed together with one of the first set or the second set of clutch plates abutting against the backing plate when the clutch assembly is engaged. The clutch assembly further includes a connecting hub coupled to the inner hub, such that the connecting hub supports the stationary backing plate with a bearing disposed between the connecting hub and the backing plate.

10 Claims, 2 Drawing Sheets

CLUTCH BACKING PLATE FOR BEARING SUPPORT

FIELD

Figure 1:
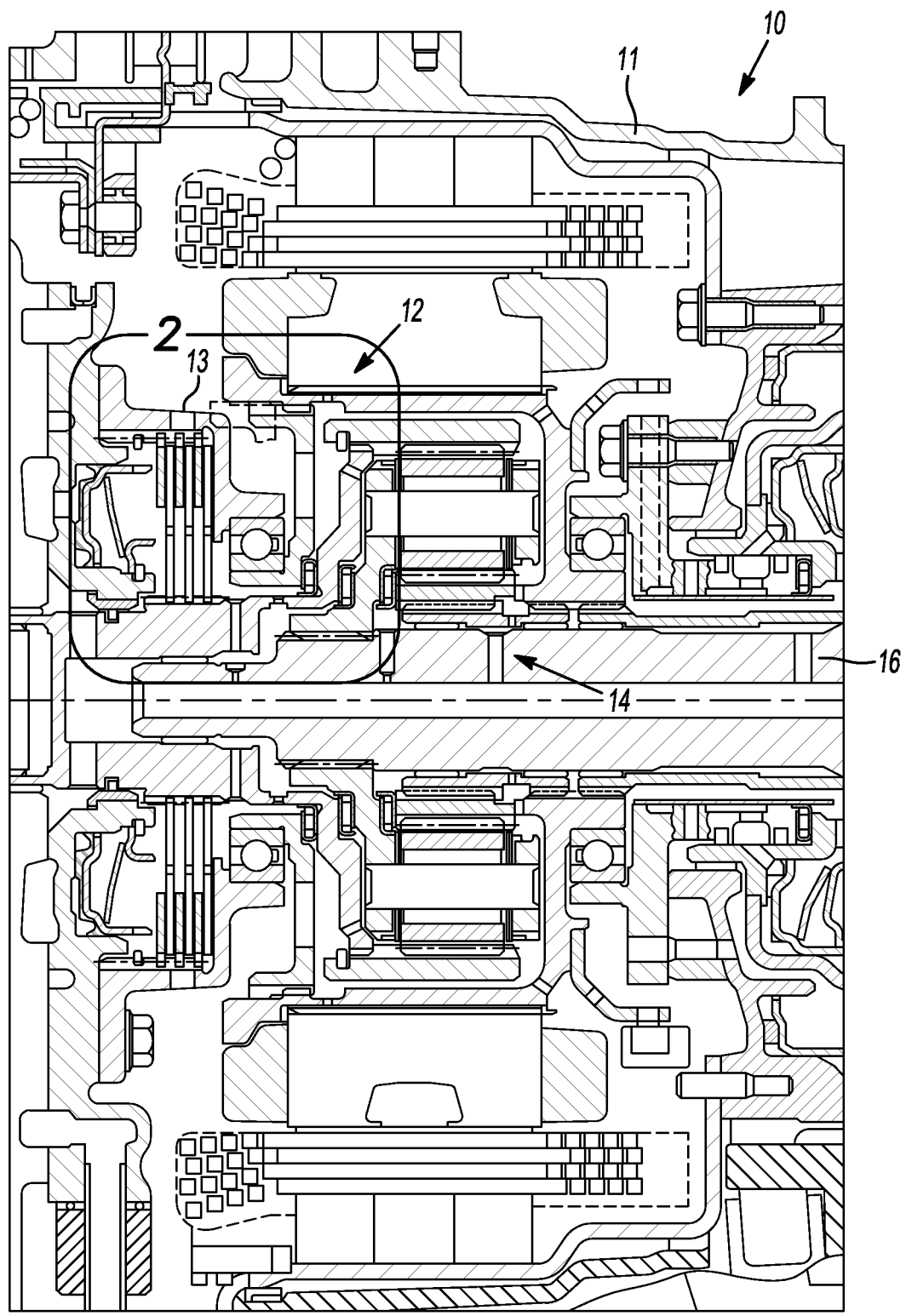

The present invention relates to a clutch backing plate of a clutch assembly for a multiple speed transmission. More specifically, the present invention relates to a clutch backing plate employed as a bearing support in a multiple speed transmission.

BACKGROUND

The statements in this section merely provide background information related to the present disclosure and may or may not constitute prior art.

Modern multiple speed transmissions commonly employ a plurality of planetary gear sets having sun gears, planet gear carriers and ring gears which are permanently coupled together or selectively interconnected by clutch assemblies to achieve a reverse gear and a plurality of forward gear ratios.

Selection of speed ratios is typically accomplished by a microprocessor transmission control module that employs various vehicle parameters, for example, vehicle speed, and various driver input signals, for example, accelerator pedal position, to select the appropriate speed ratios. The transmission then actuates or engages a combination of the clutch assemblies to provide the desired speed ratios.

In general, a clutch assembly includes a clutch pack with one set of clutch plates that interweave and engage with another set of clutch plates. Further, the clutch assembly typically includes a backing plate that plate provides support to the clutch pack so that the clutch plates deflect a desired amount to provide appropriate load distribution over the plates. Although the coupling of the clutch assemblies with the associated gear sets has worked in the past as desired, there is a need, however, for transmissions with reduced component complexities and reduced space requirements.

SUMMARY

A clutch assembly includes a first set of clutch plates and a second set of clutch plates interweaved with the first set of clutch plates. The second set of clutch plates is coupled to a rotatable input shaft. And the first set of clutch plates is coupled to a stationary backing plate mounted about the input shaft. The first set of clutch plates and the second set of clutch plates are compressed together with one of the first set or the second set of clutch plates abutting against the backing plate when the clutch assembly is engaged. The clutch assembly further includes a connecting hub coupled to a rotor hub so that the connecting hub and the rotor hub rotates at the same speed. A bearing is disposed between the connecting hub and the backing plate such that the backing plate provides bearing support to the connecting hub and the rotor hub.

In another implementation, a gear and clutch arrangement includes a clutch assembly with a first set of clutch plates and a second set of clutch plates interweaved with the first set of clutch plates. The second set of clutch plates is coupled to a rotatable input shaft. And the first set of clutch plates is coupled to a stationary backing plate mounted about the input shaft. The first set of clutch plates and the second set of clutch plates are compressed together with one of the first set or the second set of clutch plates abutting against the backing plate when the clutch assembly is engaged. The clutch assembly further includes a connecting hub coupled to a rotor hub so that the connecting hub and the rotor hub rotates at the same speed. A bearing is disposed between the connecting hub and the backing plate such that the backing plate provides bearing support to the connecting hub and the rotor hub. The gear and clutch arrangement also includes a gear assembly with a first member coupled to the input shaft. When the clutch assembly is engaged, the gear assembly and the clutch assembly are coupled together.

The gear assembly may be a planetary gear assembly that includes a second member and third member in addition to the first member.

In some arrangements, the first member is a planet gear carrier, the second member is a sun gear, and the third member is a ring gear. The planet gear carrier may include a plurality of planet gears disposed between and each meshing with both the sun gear and the ring gear.

Further features, advantages, and areas of applicability will become apparent from the description provided herein. It should be understood that the description and specific examples are intended for purposes of illustration only and are not intended to limit the scope of the present disclosure.

DRAWINGS

Figure 2:
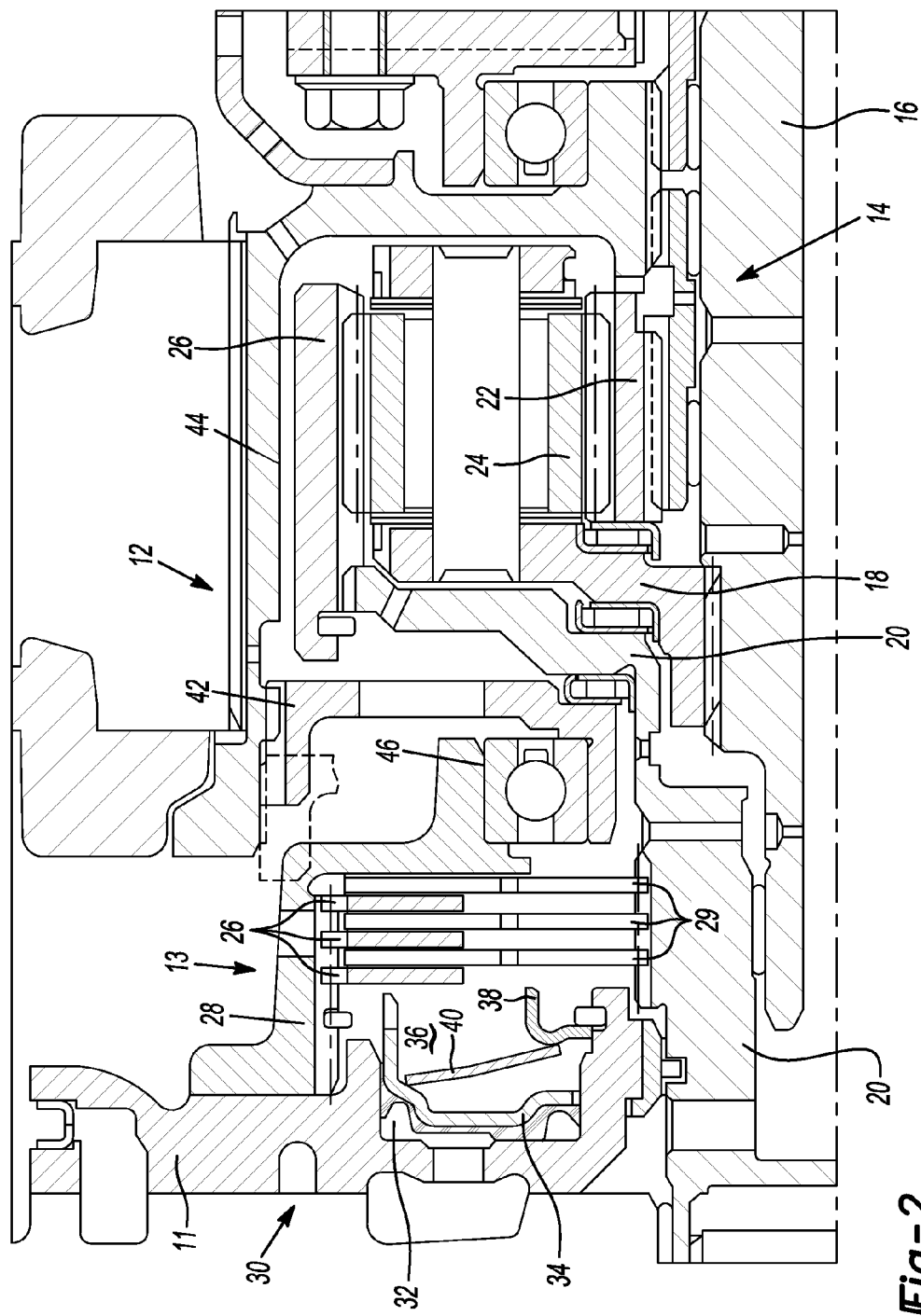

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 1 is a sectional view of a portion of a multiple speed transmission in accordance with the principles of the present invention; and FIG. 2 is an enlarged, fragmentary view of the region 2 in FIG. 1 showing a clutch assembly with a clutch backing plate in accordance with the principles of the present invention.

DETAILED DESCRIPTION

The following description is merely exemplary in nature and is not intended to limit the present disclosure, application, or uses.

Referring now to the drawings, a transmission embodying the principles of the present invention is illustrated in FIG. 1 and designated as 10. The transmission 10 includes a typically cast, metal housing such as the housing 11 which encloses and protects the various components of the transmission 10. The housing 11 includes a variety of apertures, passageways, shoulders and flanges which position and support these components. The transmission 10 further includes a gear and clutch arrangement 12.

The gear and clutch arrangement 12 includes a plurality of gear sets and a plurality of shafts. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 10 may vary without departing from the scope of the present disclosure. In the particular arrangement shown in the drawings, the gear and clutch arrangement 12 includes a clutch assembly 13 and a planetary gear assembly 14 contained within the transmission housing 11 and mounted about a shaft 16. The planetary gear assembly 14 includes a planet gear carrier 18 that couples with an input shaft 20.

It should be understood that although the planetary gear assembly 14 herein described and illustrated is a compound assembly having a plurality of gear trains comprising two planet gears in the planet gear carrier 18, the present invention may alternatively be utilized with a simple planetary gear assembly, that is, a planetary gear assembly having a plurality of planet gears disposed between and each meshing with both a sun gear and a ring gear. As a further alternative, the planet gear carrier 18 may be replaced by any torque carrying member such as a shaft, quill or similar component.

In the particular arrangement shown in FIG. 2, the planetary gear assembly 14 also includes a sun gear 22 which is coupled to the main shaft 16 by an interengaging spline set and is in constant mesh with one of each of the pairs of planet gears 24 and a ring gear 26 that is in constant mesh with the other of each of the pairs of planet gears 24.

The clutch assembly 13 includes a first plurality of clutch plates or discs 26 coupled to a stationary, annular shaped backing plate 28 that is connected to the housing 11. The first plurality of clutch plates or discs 26 are interleaved with a second plurality of clutch plates or discs 29 coupled to the input shaft 20. Accordingly, when the clutch assembly 13 is engaged, the clutch assembly 13 operates as a brake. The backing plate 28 can be formed as a unitary one-piece member or from multiple components. The backing plate 28 can be made, for example, by casting, machining, or stamping. Further, the backing plate can be made from a powdered metal. The backing plate 28 can be made from any suitable material such as, for example, steel. The clutch plates or discs 26 and 29 may be annular shaped as well. The clutch plates 26 and 29 can be made from any suitable material such as steel. They can each have a layer of material on either side to enhance their frictional capabilities.

The clutch assembly 13 also includes a balanced hydraulic operator 30 having an apply cylinder, chamber or cavity 32. Axially and slidably disposed within the apply cylinder or cavity 32 is a piston 34 which engages and compresses and releases the first and second pluralities of clutch plates or discs 26 and 29. Controlled, pressurized hydraulic fluid is provided to the apply chamber 32 of the balanced hydraulic operator 30.

On the side or face of the piston 34 opposite the apply chamber or cavity 32 is a balance chamber or cavity 36. A circular plate or dam 38 which includes suitable fluid tight seals and closes off the balance chamber or cavity 36 and allows axial translation of the piston 34. Disposed within the balance chamber or cavity 36 is a Belleville spring or wave washer 40 that provides a biasing or restoring force to translate the piston 34 to the left in FIGS. 1 and 2 and urges disengagement of the clutch assembly 13. The piston 34 selectively compresses the clutch plates or discs 26 and 29 against the backing plate 28 such that one of the clutch plates 29 abuts against the backing plate 28 to engage the clutch assembly 13.

The gear and clutch arrangement 12 also includes a rotor hub 44 positioned about the input shaft 20. A separate connecting hub 42 is coupled to the rotor hub 44 by, for example, a spline such that the connecting hub 42 and the rotor hub 44 rotate at the same speed. The backing plate 28 provides bearing support to the connecting hub and the rotor hub 44. Specifically, a ball bearing 46 is disposed between the stationary backing plate 28 and the connecting hub 42 so that the backing plate is able to provide the bearing support to the connecting hub 42 and the rotor hub 44. The arrangement of the gear and clutch arrangement 12 provides various benefits. For example, the rotor hub 44 is a simplified design to allow for more axial space by utilizing the backing plate 28 for the bearing support. The arrangement enables the use of fewer components, which reduces component costs and space requirements. Further, directly coupling the stationary backing plate 28 to the housing 11 allows for acceptable positional tolerance capabilities. Such an arrangement provide particular benefits for provide bearing support in a motor for a hybrid type motor vehicle.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch assembly comprising:
a first set of clutch plates and a second set of clutch plates interweaved with the first set of clutch plates, the second set of clutch plates being coupled to a rotatable input shaft;
a stationary backing plate mounted about the input shaft, the first set of clutch plates being coupled to the backing plate, the first set of clutch plates and the second set of clutch plates being compressed together with one of the first set or the second set of clutch plates abutting against the backing plate when the clutch assembly is engaged;
a gear set, the input shaft coupling the clutch assembly to the gear set when the clutch assembly is engaged;
a connecting hub coupled to a rotor hub so that the connecting hub and the rotor hub rotates at the same speed, the connecting hub having a generally annular shape defining an interior region and being disposed between the clutch assembly and the gear set; and
a bearing disposed in the interior region of the connecting hub and between the connecting hub and the backing plate such that the backing plate provides bearing support to the connecting hub and the rotor hub.

2. The clutch assembly of claim 1 wherein the backing plate has an annular shape.

3. The clutch assembly of claim 1 wherein the backing plate made from a powdered metal.

4. The clutch assembly of claim 1 wherein the backing plate is made from steel.

5. The clutch assembly of claim 1 wherein each of the first set of clutch plates and the second set of clutch plates has an annular shape.

6. The clutch assembly of claim 1 wherein each of the first set of clutch plates and the second set of clutch plates is made of steel.

7. The clutch assembly of claim 1 wherein each of the first set of clutch plates and the second set of clutch plates has a layer of material on either side of the plate to enhance the frictional capabilities of the plate.

8. The clutch assembly of claim 1 wherein the clutch assembly includes a hydraulic operator.

9. The clutch assembly of claim 8 wherein the hydraulic operator includes a chamber that receives hydraulic fluid to actuate the hydraulic operator.

10. The clutch assembly of claim 9 wherein the hydraulic operator includes a piston that is disposed within the chamber, the piston compressing and releasing the first and second set of clutch plates as hydraulic fluid flows in and out of the chamber to engage and disengage the clutch assembly.

* * * * *